United States Patent [19]
Kato

[11] Patent Number: 6,044,266
[45] Date of Patent: Mar. 28, 2000

[54] METHOD AND APPARATUS FOR TRANSMITTING DATA PACKETS OVER VOICE CHANNEL

[75] Inventor: Hidenori Kato, Tokyo, Japan

[73] Assignee: NEC Corporation, Tokyo, Japan

[21] Appl. No.: 08/916,268

[22] Filed: Aug. 22, 1997

[30] Foreign Application Priority Data

Aug. 27, 1996 [JP] Japan .................................. 8-224772

[51] Int. Cl.[7] ............................................. H04Q 7/20
[52] U.S. Cl. ...................... 455/422; 455/466; 455/455; 455/445; 455/450
[58] Field of Search ................................. 455/422, 432, 455/466, 456, 450, 434, 436, 438, 419, 445, 464; 370/433, 435, 465, 528

[56] References Cited

U.S. PATENT DOCUMENTS

| 5,513,183 | 4/1996 | Kay et al. | 370/95.3 |
| 5,521,925 | 5/1996 | Merakos et al. | 370/95.3 |
| 5,721,762 | 2/1998 | Sood | 455/466 |
| 5,790,952 | 8/1998 | Seazholtz et al. | 455/432 |

*Primary Examiner*—Daniel S. Hunter
*Assistant Examiner*—Yemane Woldetatios
*Attorney, Agent, or Firm*—McGinn & Gibb, P. C.

[57] ABSTRACT

A communication system includes a first station in voice communication with a base station and a second station in data communication with the base station. The second station monitors the voice communication and identifies predetermined periods (e.g., preferably silent periods) of the voice communication. The second station transmits data packets during the predetermined periods.

29 Claims, 9 Drawing Sheets

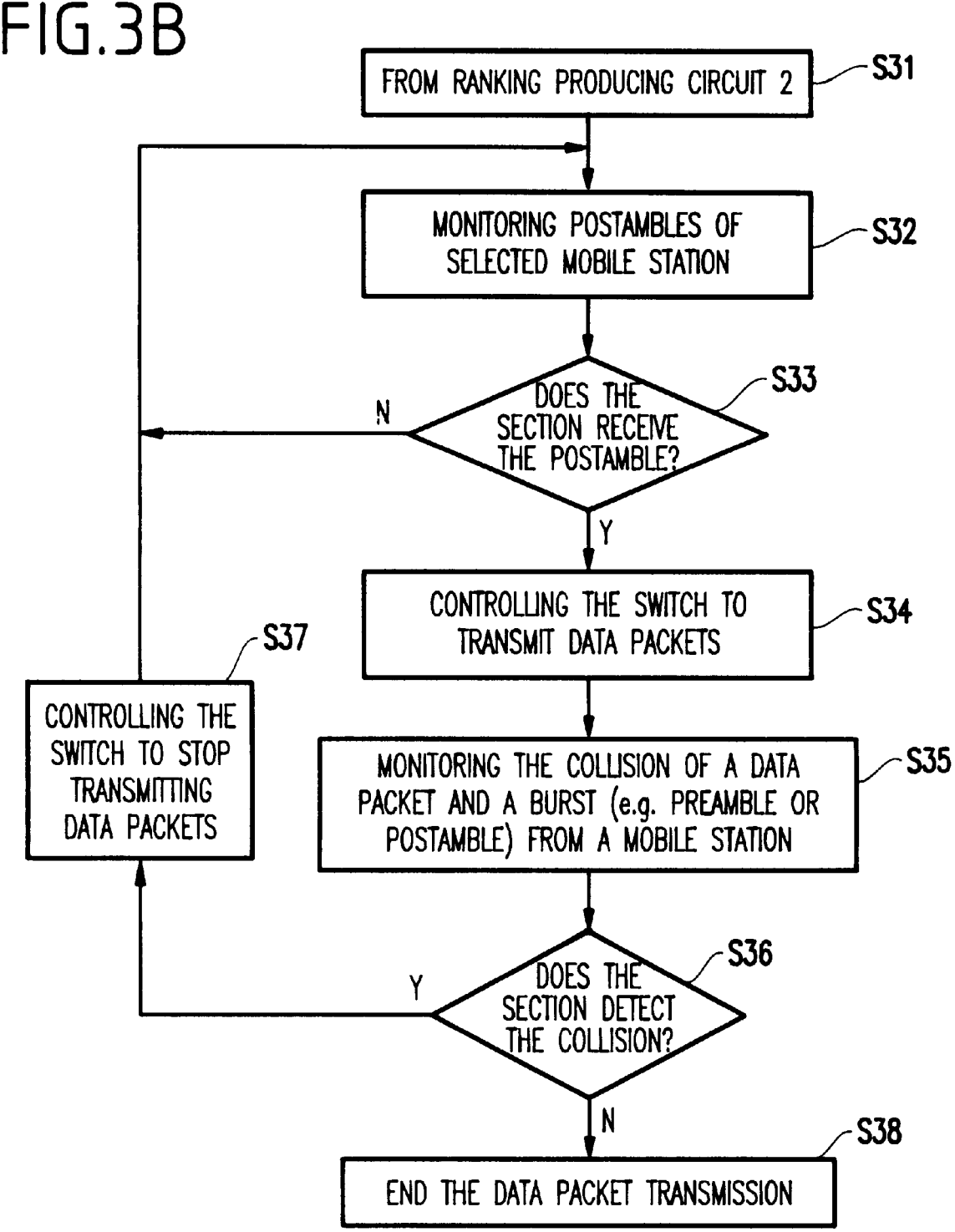

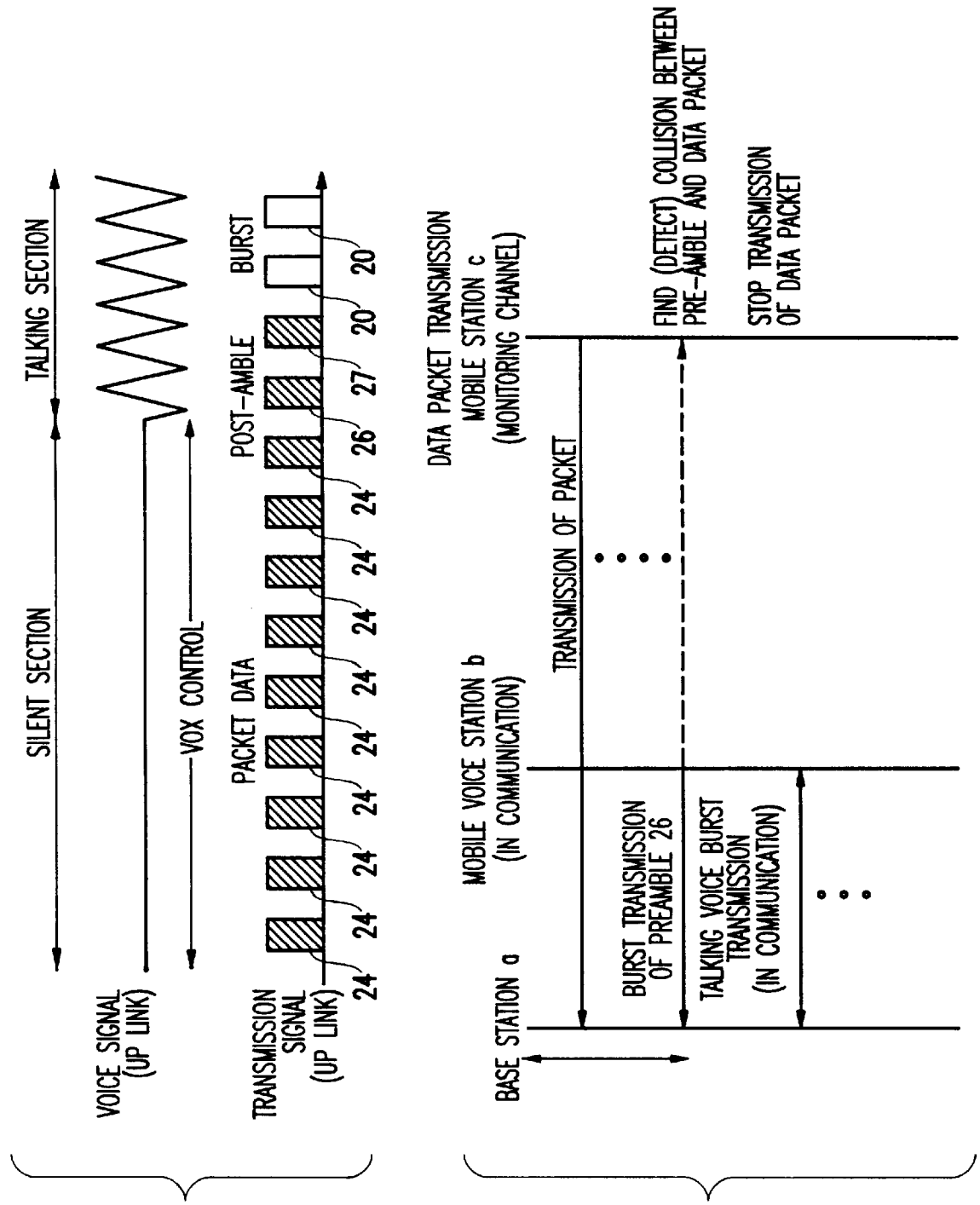

METHOD AND APPARATUS FOR TRANSMITTING DATA PACKETS OVER VOICE CHANNEL

BACKGROUND OF THE INVENTION

1. Field of the Invention

The present invention generally relates to a method and apparatus for acquiring a channel in radio packet-type data communication which is employed in mobile communications such as a cellular phone system. More particularly, the present invention relates to a method and apparatus for acquiring a channel in radio packet-type data communication, in which the transmission status of a mobile terminal using a given channel, is monitored such that, when the monitored terminal is silent and the channel is unused, packets of data are transmitted over the channel. The present invention makes communications systems more efficient by transmitting packet-type data during periods when channels are otherwise unused (e.g., so-called "silent periods").

2. Description of the Related Art

As transmission information becomes more complex and with the wider use of multimedia, information must be transferred more efficiently. Additionally, when radio data communication is performed between a mobile terminal and a base station, a packet-type communication system is used for effectively utilizing a limited number of radio channels so as to minimize communication cost and to serve more users.

For example, a typical packet-type communication system is a Cellular Digital Packet Data (CDPD) system. The CDPD system includes a CDPD base station, which can be used with a base station for a cellular phone system now in service. The CDPD base station identifies (and assigns) radio channels which are not used for voice communication, and transmits data packets over the unused channels. Thus, radio channels not being used for voice communication are selectively used for data communication.

In such a system, voice communication is given preference in utilizing the radio channels. Thus, if a request exists to use a channel for voice communication, the data communication concedes the channel to the voice communication. Hence, even if a channel is being used for data communication, upon a request for a mobile voice unit, the data communication is terminated, and must wait for another channel to become available (or "hops" to another channel if one is available).

FIG. 9(a) is a block diagram of a packet-type transmitter, and FIG. 9(b) is a block diagram illustrating the operation of the packet-type transmitter.

In operation, a use channel control section 7 controls which channels are used for data transmission based on channel state information (e.g., information regarding which channels are not being used for voice communication). A receiver section 1 indicates which channels are not being used. A switch 5 performs an ON-OFF switching operation, under the control of the channel control section 7, to control whether voice information or packet-type data is transmitted over a given channel.

As shown in FIG. 9(b), in step 30 the operation begins with a request for a packet-type data transmission being made to the base station. In block 31, a determination is made as to whether there is an unused channel assigned by the base station. In other words, it is determined whether an available channel (e.g., a channel not being used by another mobile unit) exists. If there is no available channel, the process returns to step 30 to again request a packet-type data transmission.

If a channel is available, in step 16, packet transmission is started. In step 32, it is determined whether a mobile voice station requests the channel being used for packet-type data transmission and more specifically whether a voice call currently uses the channel. If "YES" in step 32, processing proceeds to step 33, and a search is begun for a different available channel. If there is no voice request (e.g., a "NO" in step 32), the processing proceeds to step 18, where the packet-type data transmission is completed, and the process terminates.

In conventional packet-type data communication systems, voice communication is given preference, and a channel is used exclusively for voice or exclusively for data (e.g., conventional systems do not share voice and packet-type data on the same channel). Therefore, with conventional systems, if all of the available channels are transmitting voice communication, data cannot be transmitted. This is a problem and lowers system efficiency.

Hence, if a voice communication (for example, a cellular telephone call) is in progress, the channel used by the cellular phone cannot be used to transmit data packets during the entire length of the call (or during the time that the cellular phone remains within a given cell). Further, the channel is reserved for voice communication upon receiving a request for connection for voice communication. In conventional systems, voice communication dominates the channel availability, regardless of whether actual voice bursts are being transmitted and received. Therefore, the conventional system does not use the "dead air" time (e.g., the time period between words or other silent periods of voice communication, or the time after a request for voice channel connection is received but no actual voice communication is occurring) to transmit data or other signals.

Additionally, if a channel is being used for the packet-type data communication, it will be interrupted and terminated if there is a request for voice communication. The above-mentioned problems result in the conventional systems having poor efficiency.

JPA 2-117227 discloses the general concept of transmitting data packets over the voice channel. However, for data communication, JPA '227 uses/requires an idle (e.g., vacant) channel not being used for voice communication. It cannot transmit packet data during a silent period in a channel being used for voice communication.

SUMMARY OF THE INVENTION

In view of the foregoing and other problems of the conventional systems, it is an object of the present invention to simultaneously use a radio channel for voice communication and for packet-type data communication.

Another object of the present invention is to reduce congestion or interruption during packet-type data communication.

In a first aspect of the present invention, a system for acquiring a channel in radio packet data communication includes a receiver section for receiving a voice burst transmitted from a mobile station in communication with a base station and measuring receiving levels, a ranking producing section for producing a ranking list of the receiving state based on receiving levels from the output of the receiver section radio waves transmitted from the communicating mobile station, and a channel monitor/control section for selecting a channel with a predetermined receiving state from the output from the ranking producing section and monitoring the receiving state of the channel.

When the mobile station is determined to have a state for not sending a voice burst (e.g., no voice burst is being transmitted), packet data is transmitted by interrupting the channel on which the voice burst is not transmitted for transmitting packet data.

When the terminal in voice communication transmits a voice burst again during transmission of packet data, the data communication is suspended, and it is determined whether another mobile terminal has a state for not transmitting a voice burst (e.g., no voice burst is being transmitted), thereby a channel for radio packet data communication is obtained by repeating such steps.

In another aspect of the present invention, a data communication method and system is provided for use with a base station, a mobile voice station in voice communication with the base station and a mobile data station in data communication with the base station. The mobile data station monitors the voice communication and identifies silent periods of the voice communication. The silent periods include periods between sounds. The mobile data station transmits data packets during the silent periods.

Unlike the conventional systems such as JPA '227, the present invention does not require an idle (vacant) channel, but can transmit data during a silent period in a channel being used for voice communication. Thus, overall system efficiency is increased, and congestion and interruption during packet-type data communication is reduced.

BRIEF DESCRIPTION OF THE DRAWINGS

The foregoing and other objects, aspects and advantages will be better understood from the following detailed description of a preferred embodiment of the invention with reference to the drawings, in which:

FIG. 3(b) illustrates a flowchart of the operations of the channel monitor/control section 3;

FIG. 8(a) is a schematic wave-form diagram illustrating a beginning voice burst of the present invention;

FIG. 8(b) is a schematic timing diagram illustrating the operation of the present invention during a beginning voice burst;

DETAILED DESCRIPTION OF A PREFERRED EMBODIMENT OF THE INVENTION

Figure 1A:
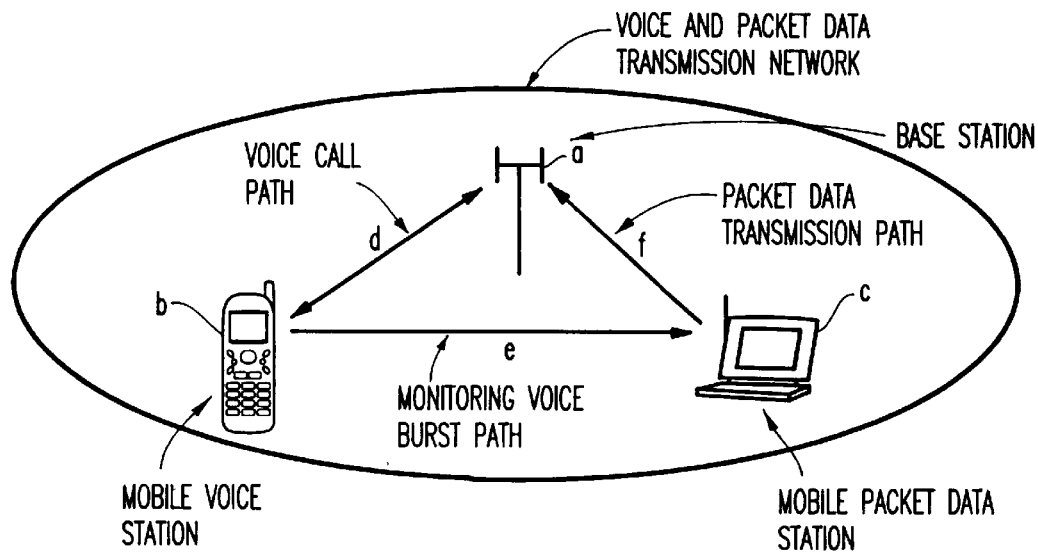
FIG. 1(a) is a schematic diagram of a packet-type transmission system according to an embodiment of the present invention.

Referring now to the drawings, and more particularly to FIG. 1(a), a packet-type transmission system according to the present invention is illustrated. In FIG. 1(a), a is a base station, b is a mobile station for voice communication (e.g., a "mobile voice station"), c is a mobile station for packet transmission (e.g., a "mobile data station"), d is a call path for the mobile voice station b, e is a path for monitoring voice bursts (e.g., signals containing voice transmissions) from the mobile voice station b, and f is a packet transmission path for the mobile data station c.

The base station a engages in voice message communication with the mobile voice station b through the call path d, and the mobile data station c monitors the state of voice bursts being transmitted from the mobile voice station b through the burst monitor path e. The mobile data station c transmits data to the base station a through the packet transmission path f only when the voice burst monitor path e indicates that the call path d is silent (e.g., no voice burst is being transmitted). Typically, the mobile data station c polls all stations b and selects the best channel from them, as described below.

Figure 1B:
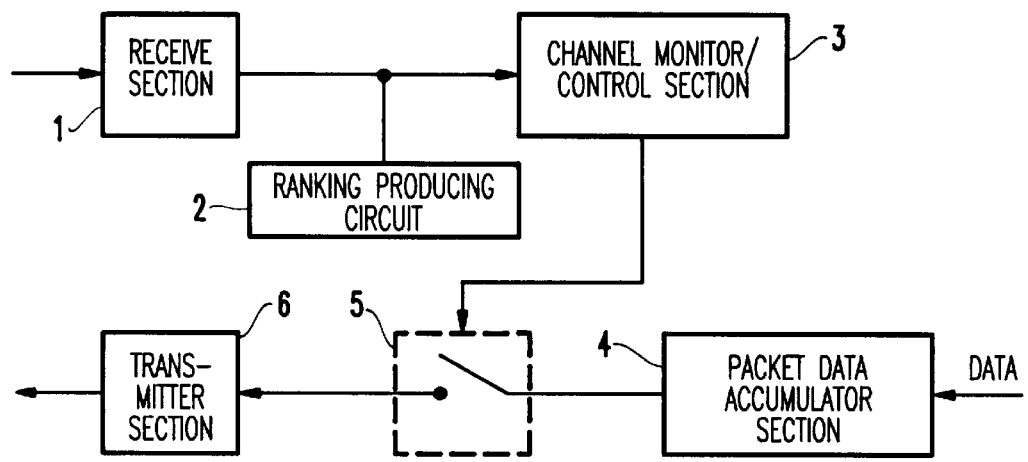
FIG. 1(b) is a schematic block diagram of a packet-type transmitter of the system according to the present invention.

FIG. 1(b) is a block diagram of a packet-type transmitter according to an embodiment of the present invention located within, for example, mobile data station c. A receiver section 1 monitors a voice burst being transmitted from various mobile voice stations b to base station a, and measures the signal level of the voice bursts. A ranking producing section 2 continually measures a level of electrical power, and also produces a ranking list of the different signal levels output from the receiver section 1 according to levels of the radio waves transmitted by the mobile voice stations b.

A channel monitor/control section 3 receives a channel number level and the input signal, selects a channel with the best receiving state from the output of the ranking producing circuit 2, and monitors the receiving state of that channel. The best receiving state is determined as the strongest signal. Specifically, it is based on the channel which has the strongest signal because the VOX control of such a channel is monitored most correctly (e.g., precisely).

Each of the mobile voice stations b transmits an ending voice burst (indicating the end of a voice burst) which will be followed by a certain period of silence (e.g., during which the user is not talking on a channel (e.g., an uplink), but he may be listening to the other party (e.g., on the downlink)). The ending voice burst is discussed in greater detail below with regard to FIG. 6(a) The mobile stations b also transmit a starting voice burst indicating the starting of a series of voice bursts. The starting voice burst is discussed in greater detail below with regard to FIG. 8(a). Between the ending voice burst and the next subsequent (beginning) voice burst is silence. The silent state is discussed below with reference to FIG. 7(a).

This series of ending and beginning voice bursts is called Voice-Operated Transmission (VOX). The VOX control for mobile voice station b can be divided into three patterns. The first pattern occurs when the mobile voice station b changes from the talking state to the silent state (e.g., an ending voice burst), the second pattern occurs when the mobile voice station b remains unchanged in the silent state, and the third pattern occurs when the mobile voice station b changes from the silent state to the talking state (e.g., a beginning voice burst).

The channel monitor/control section 3 monitors VOX control information of the mobile station b and the receiving level at the terminal c. The section 3 monitors the receiving level of the signal from the mobile voice station b. The monitor/control section 3 controls a switch 5, which is movable between first and second positions (e.g., an active position and an inactive position). The switch is activated (turned ON) when the monitor/control section 3 determines that a radio channel can be used, and is inactivated (turned OFF) when the monitor/control section 3 determines that the radio channel cannot be used. The monitor/control section 3 constantly monitors the various channels available to a respective base station. When an ending voice burst is detected, transmission of packets of data is commenced on that channel by activating the switch 5, and the packets of data continue to be transmitted until a beginning voice burst signal is received.

A packet-type data accumulator section 4 accumulates data to be transmitted, in the form of data packets. The switch 5 starts and stops the transmission of the data packets according to information from the channel monitor/control section 3.

A transmitter section 6 performs transmission over the channel selected by the channel monitor/control section 3.

Figure 2A:
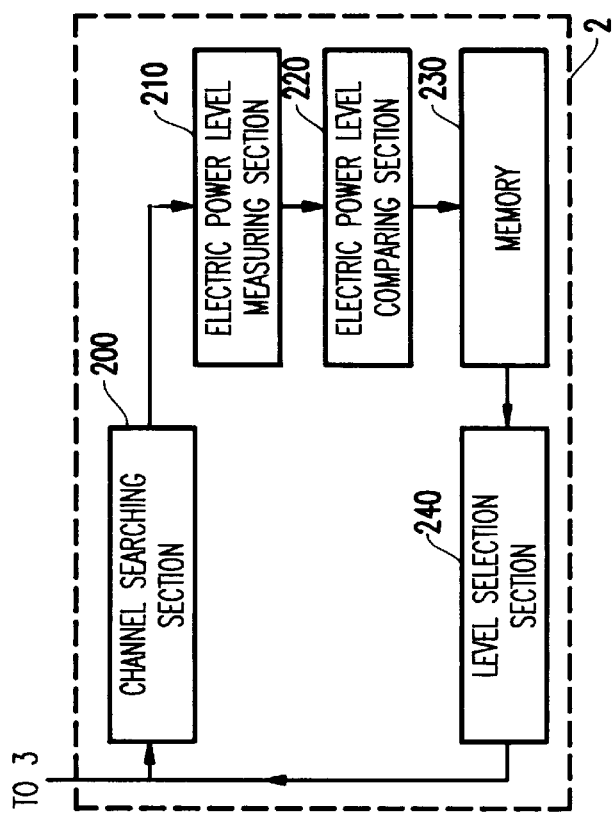
FIG. 2(a) illustrates the structure of a ranking producing circuit 2 of the packet-type transmitter of FIG. 1(b)
Figure 2B:
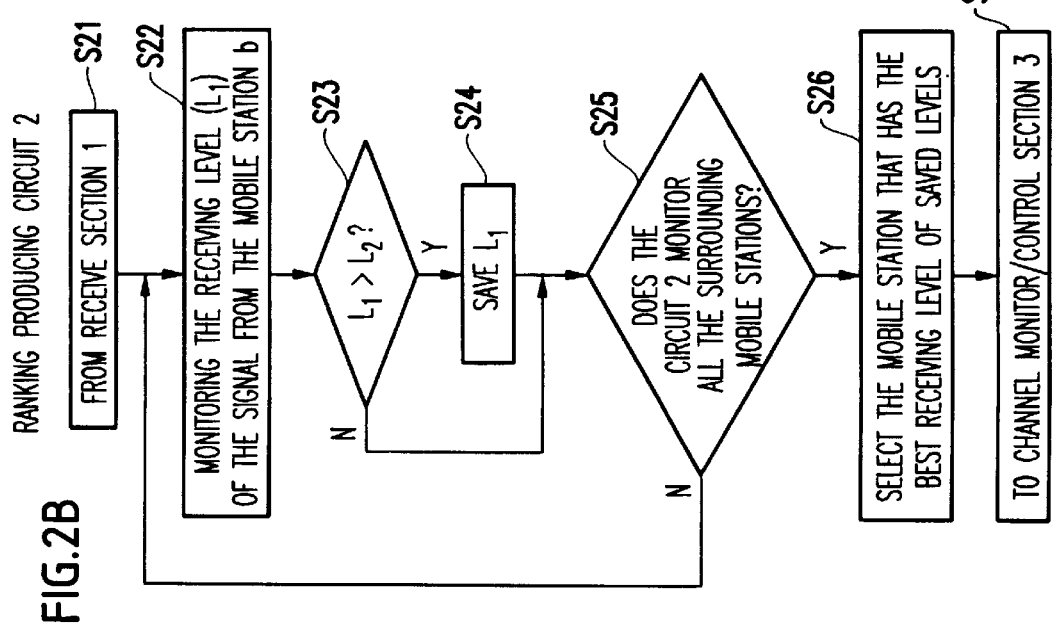
FIG. 2(b) illustrates a flowchart of the operations of the ranking producing circuit 2.

Referring now to FIG. 2(*a*), the structure of the ranking producing circuit is shown in detail. As shown in the FIG. 2(*a*), the ranking producing circuit includes a channel searching section 200, an electric power level measuring section 210, an electric power level comparing section 220, a memory 230, and a level selection section 240.

First, the channel searching section 200 is for searching/monitoring all of the surrounding mobile voice stations b based on inputs from the ranking producing circuit 2. Specifically, the channel searching section 200 receives an input signal from receiver section 1, and provides an output (relating to a channel) to the electric power level measuring section 210. As a result, section 210 monitors and measures the receiving level (L1) of the signal from a mobile voice station b.

Based on an output from section 210, the electric power level comparing section 220 compares the electric power level L1 with a predetermined value (e.g., a predetermined threshold level L2), to determine whether L1 is greater than the predetermined value.

If L1 is greater than the predetermined value L2, then level L1 is saved (along with the channel number associated with the level L1) in memory 230. Memory 230 stores the channel number level of each channel above the threshold in a table or the like. If the determination is "NO" (e.g., L1 is less than L2), then the channel number and level are not stored.

Based on an output from the memory 230, a level selection section 240 selects the channel with the highest level. That is, the mobile voice station b is selected that has the best receiving level of the saved levels.

Thereafter, the level selection section 240 provides an output to the channel monitor/control section 3 representing the mobile station b having the best receiving level of the saved levels.

Turning to FIG. 2(*b*), the operation of the ranking producing circuit 2 will be described in further detail. First, in step S21, a signal is received by the channel searching section 200 from the receiver section 1. Thereafter, in step S22, the receiving level (L1) of the signal from the mobile voice station b is monitored/measured by the electric power level measuring section 210 based on an output from the channel searching section 200.

In step S23, it determined by the electric power level comparing section 220 whether L1 is greater than a predetermined value (e.g., a predetermined level L2).

If the determination is "YES" in step S23, then the process proceeds to step S24 and L1 is saved in memory 230, and the process proceeds to step S25.

Conversely, if the determination in step S23 is "NO" (e.g., L1 is less than L2), then the process immediately proceeds to step S25.

In step S25, it is determined whether all of the surrounding mobile voice stations b are (e.g., have been) monitored by ranking producing circuit 2. If the determination is "NO", the process loops back to step S22. If the determination is "YES", then the process continues to step S26.

In step S26, the level selection section 240 selects the mobile voice station b that has the best receiving level of the saved levels in the memory 230.

Thereafter, in step S27, an output is provided to the channel monitor/control section 3 representing the mobile station b having the best receiving level of the saved levels.

Figure 3A:
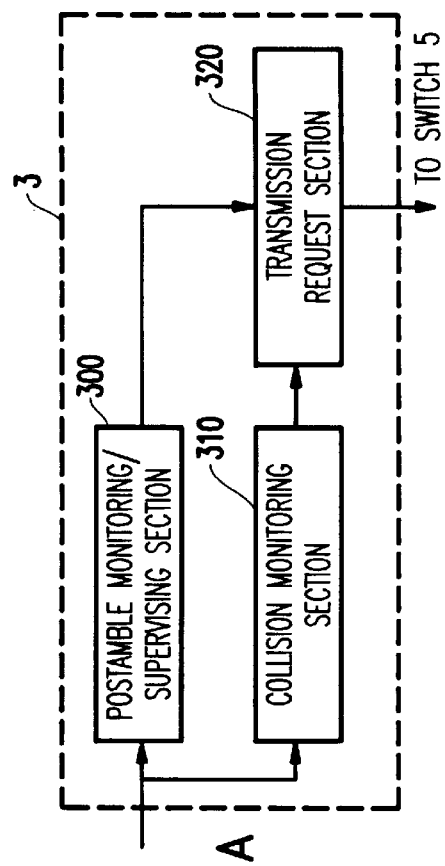
FIG. 3(a) illustrates the structure of a channel monitor/control section 3 of the packet-type transmitter of FIG. 1(b)

Turning now to FIG. 3(*a*), the structure of the channel monitor/control section 3 will be described in further detail. The channel monitor/control section 3 includes a postamble monitoring/supervising section 300, a collision monitoring section 310, and a transmission request section 320.

Specifically, the postamble monitoring/supervising section 300 receives an output from the ranking producing circuit 2 representing the mobile voice station b having the best receiving levels of the saved levels, and monitors the postambles of the selected mobile voice station b (e.g., determines whether the postambles have been received). Thus, section 300 determines whether it has received the postambles of the selected mobile voice station b. If the determination is "YES", then the postamble monitoring/supervising section 300 provides an output to the transmission request section 320, and the switch 5 is controlled to transmit the data packets. If section 300 determines that it has not received the postambles, then the section 300 simply continues to wait for a postamble, and the switch 5 is unchanged from its current mode.

The collision monitoring section 310 also receives the output from the ranking producing circuit 2. Section 310 detects whether an actual collision has occurred between the voice transmission and the data packet transmission. Specifically, the collision of a data packet and a burst (e.g., a preamble or a postamble) from the mobile voice station b is monitored and determined by the collision monitoring section 310. It is noted that section 310 simply discriminates the collision, as opposed to necessarily discriminating the object of the collision (e.g., preamble or postamble).

If the collision monitoring section 310 detects a collision, then the collision monitoring section 310 provides an output to the transmission request section 320, thereby to control the switch 5 to stop transmitting the data packets and avoid further collision. By the same token, if the collision monitoring section 310 does not detect a collision, then the packet data transmission continues until it is completed.

Turning to FIG. 3(*b*), the operation of the channel monitor/control section 3 will be described in further detail.

First in step S31, an output is received from the ranking producing circuit 2.

Thereafter, in step S32, postambles of the selected mobile voice station b are monitored by the postamble monitoring/supervising section 300.

In step S33, it is determined whether the section 3 has received the postamble. If the determination is "NO", then the process loops back to step S32.

If the determination is "YES", then the process continues to step S34 in which the switch 5 is controlled to transmit the data packets.

In step S35, the collision of a data packet and a burst (e.g., a preamble or a postamble) from the mobile voice station b is monitored. Thereafter, in step S36, it is determined whether the collision monitoring section 300 detects the collision.

If the collision monitoring section 300 detects the collision, the process flows to step S37, thereby to control the switch 5 (via an output from the collision monitoring section 310 to the transmission request section 320 to the switch 5) to stop transmitting the data packets.

If, in step S37, no collision is detected by the collision monitoring section 310, then the process continues to step S38, and the packet data transmission continues until it is completed.

Operation of the Invention

Figure 4:
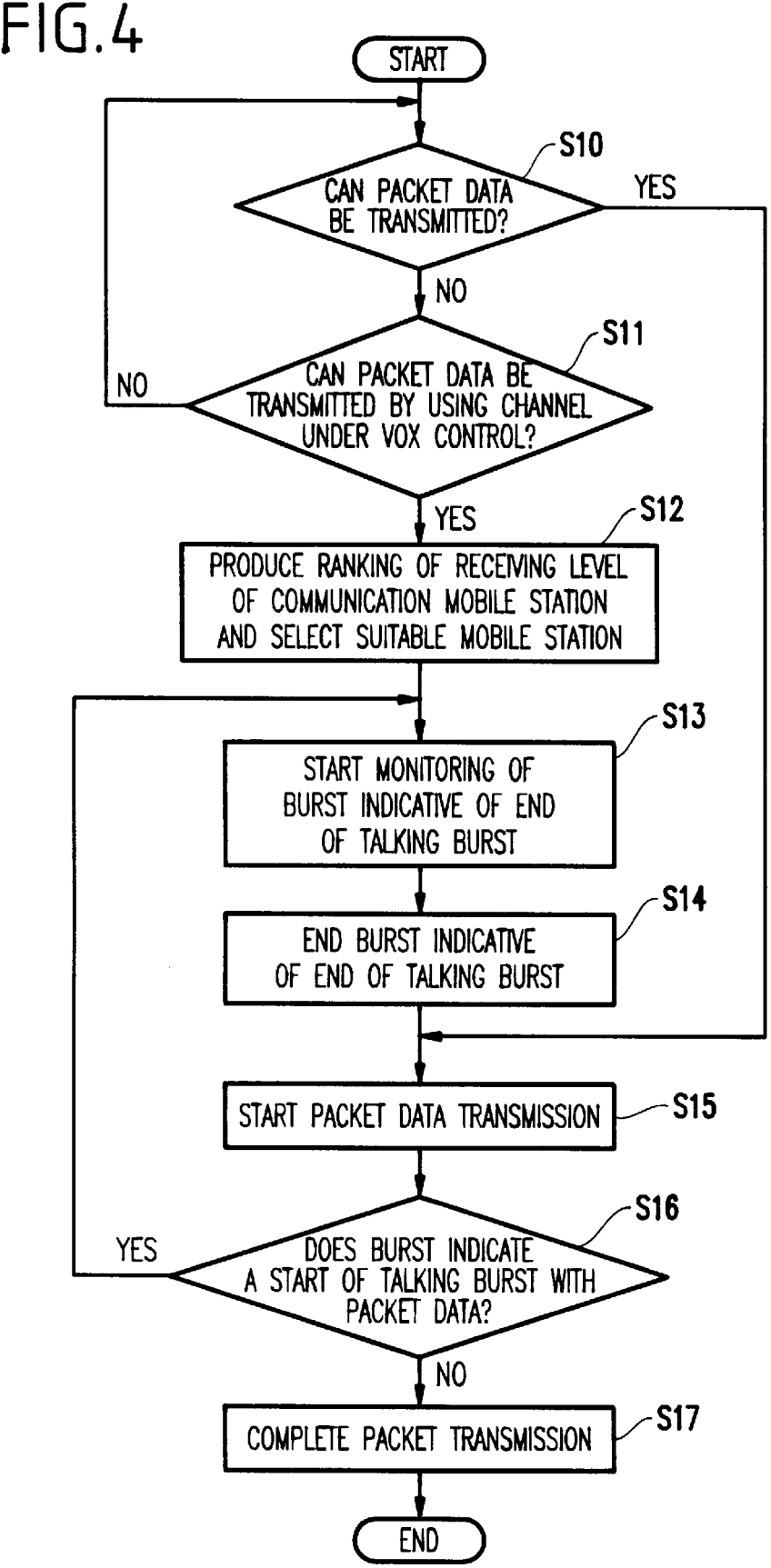
FIG. 4 is a flowchart illustrating the operation of the embodiment of the inventive packet-type transmission system.

Hereinbelow, the operation of the foregoing embodiment of the present invention is described referring to FIG. 4.

First, the mobile data station c transmits a request for packet-type data transmission to the base station a, and it is determined whether the packet data can be transmitted (step S10). If "YES" in step S10 (e.g., if there is an unused channel) the packet transmission is started (step S15). An unused channel is one that is not being used currently for any type of voice or data transmission. Detection of such a channel is well-known in the art, and thus for brevity will not be described in detail herein.

If all channels are in use (e.g., a "NO" in step S10), the mobile data station c transmits a packet transmission request using a channel that is under VOX control (step S11). The mobile data station c determines that the channel is being used according to VOX control, based on an input from mobile voice station b. The channel monitor/control section 3 selects a channel which provides a good receiving state (step S12). Specifically, based on an input from the ranking producing circuit 2 which produces a ranking of the receiving level of the communicating mobile station in the manner described above, the channel monitor/control section 3 monitors the same and selects a suitable mobile station (e.g., the mobile station having the highest receiving state).

In step S13, the monitor/control section 3 monitors the selected channel for an ending voice burst. The ending voice burst is discussed below with respect to FIGS. 6(a) and 6(b).

In step S14, the ending voice burst is detected which indicates the end of talking. Accordingly, the channel is judged to be silent and not to include voice signals (until the beginning voice burst is detected). Hence, in step S15, the data packet transmission is started, and there will be no collision of voice and data during transmission.

During the packet-type data transmission, the control/monitor section 3 monitors the selected signal channel for a beginning voice burst (step S16), and specifically it is judged whether the burst indicates a start of talking (voice) burst with packet data. Detection of the beginning voice burst is well-known to persons ordinarily skilled in the art, and is also described in greater detail below with respect to FIGS. 8(a) and 8(b).

When the beginning voice burst is detected (e.g., a "YES" in step S16), the process loops again to step S13, and the packet-type data transmission is terminated to allow the voice signal to be transmitted from the mobile voice station b to the base station a. Alternatively, if "NO" is judged in step S16, the process continues to step S17, and the data packet transmission is completed.

It is noted that, prior to termination of the packet transmission, a state is entered for monitoring a burst indicating the end of VOX state and the beginning of the voice communication ("talking") state. If a collision between packet data and voice data occurs, the packet data transmission is stopped (as described above), and monitoring begins again for a burst indicating the end of a talking burst. A burst indicating the end of VOX state and the start of a talking burst would not interfere with the communicating mobile voice station b, as discussed below.

Specifically, even though a beginning voice burst and a data packet may collide, such a collision would not interfere with the communication of the mobile voice station b because even if the beginning voice burst collides and is lost by the action of bit interleave, transmission of the same information is contained in following (subsequent) voice bursts. Thus, for example, in FIG. 8(a), if preamble signal 26 is lost, the next preamble signal 27 still can be received. Specifically, the bast station a always monitors preamble signals from the mobile voice station b during the VOX control. Even if the preamble signal 26 is lost by the collision, the base station a still can receive the next preamble signal 27.

As mentioned above, when all packets of data have been transmitted by repeating a series of operations from steps S13 through S16, a request is made for terminating the packet transmission (step S17). Once all the packets of data have been successfully transmitted, the data packets are placed in proper (sequential) order and reassembled by a device connected to the base station a, as is well-known to those ordinarily skilled in the art.

Thus, with the invention, a radio channel can be simultaneously used for voice communication and for packet-type data communication, thereby increasing the system efficiency. Additionally, congestion or interruption during packet-type data communication is greatly reduced by the present invention, as compared to the conventional systems described above.

Second Embodiment

A second embodiment of the present invention is described with reference to FIG. 5. The second embodiment can be used with a base station that does not currently perform VOX control, because the second embodiment adjusts the base station so that it will perform VOX control. Thus, down-link packet data communication can be performed by using a channel under the VOX control by performing VOX control at the base station a, as well as at the mobile voice station b. The mobile data station c transmits packet data during the silent period. The present invention requires a channel having silent periods as a channel under VOX control. Thus, a channel having a silent period is found and used by the present invention.

Additionally, in cordless telephone systems, while VOX control is performed on both the mobile station and the base station, the VOX control for the cordless telephone systems is different from the VOX control for cellular telephone systems. Briefly, the differences in the VOX control of the two systems is that the VOX control in the cordless telephone system (e.g., such as a "personal handy system" (PHS) or a personal cellular system) transmits a VOX voice burst in every fourth frame during the VOX control, but does not have preambles and postambles.

The second embodiment of the present invention accommodates the differences between the different types of VOX controls by essentially ignoring the voice bursts during the silent periods. In the cordless telephone system, the first voice burst is lost by collision with a data packet, because the cordless telephone system does not have preambles. However, the lost burst can be ignored since its frame length is only 5 ms, and thus does not contain much information.

Figure 5:
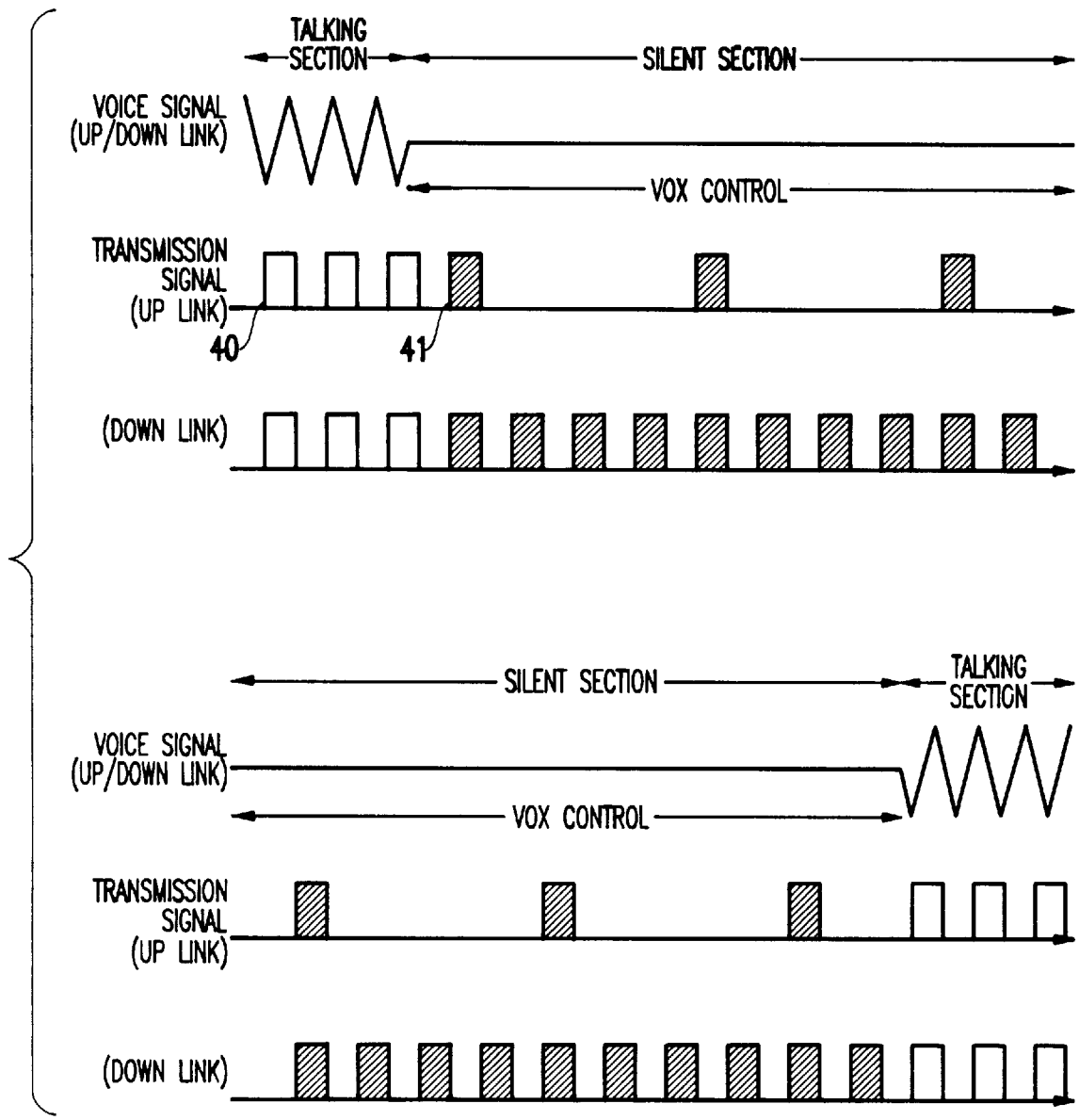
FIG. 5 illustrates schematic wave-form diagrams of voice and data signals according to the present invention.

FIG. 5 illustrates wave-form transmission signals of a typical cordless telephone under VOX control. A down-link transmission signal transmits a VOX voice burst 41 during which packets of data cannot be transmitted. An up-link transmission signal also transmits a VOX voice burst 41 in every four frames during the VOX control. Briefly, the base station a transmits a burst during the silent period in the down-link VOX control because the VOX control aims to reduce electrical power consumed by the mobile voice station b. Thus, in the second embodiment of the present invention, the down-link VOX control is not accommodated because of not having any silent periods.

Therefore, with the present invention, data packets may be transmitted in the empty frames between the voice bursts 41. However, as mentioned above, unlike cellular telephone systems, cordless telephones do not have beginning or ending voice bursts (e.g., there is no preamble/postamble at the end of VOX control), and a talking burst 40 is directly transmitted. In the second embodiment of the present invention, since the cordless telephone system does not have preambles, it stops transmitting packet data when packet data collides with a voice burst. Thus, the second embodiment of the present invention must simply wait until there is a collision, and then terminate a data packet transmission.

Further, with the second embodiment of the invention, since the talking voice burst 40 is directly transmitted, burst 40 may collide with a packet-type data burst. However, this loss does not cause significant problems because the frame length of the cordless telephone system is much shorter (e.g., as short as 5 ms) than the frame length for a cellular phone system (e.g., typically 20 ms). This loss is relatively unimportant because the amount of voice lost is typically undetectable by the user, and the loss is simply much less than the frame for a cellular telephone system. The lost data packet is retransmitted during the next silent period (e.g., when a VOX burst is detected). Thus, the control according to the present invention can be performed even on the cordless (e.g., a so-called personal cellular system or the like) telephone system.

Figure 6A:
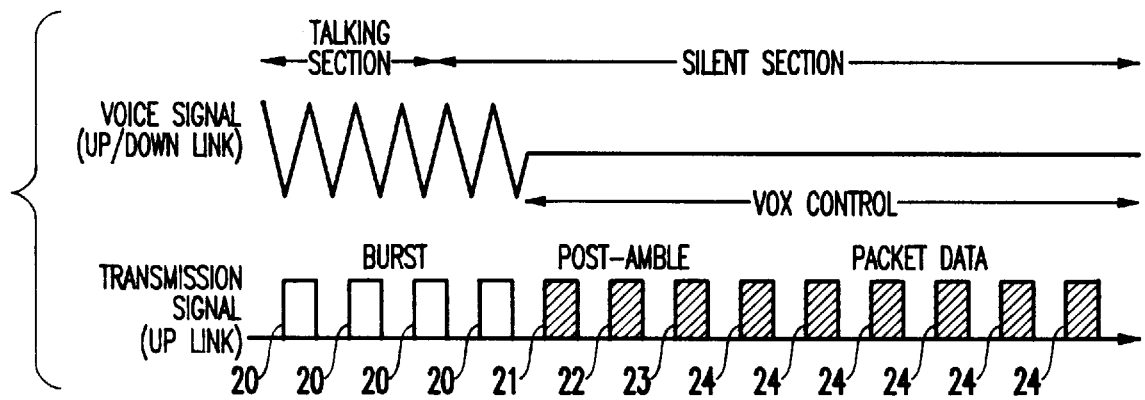
FIG. 6(a) is a schematic wave-form diagram illustrating an ending voice burst of the present invention.
Figure 6B:
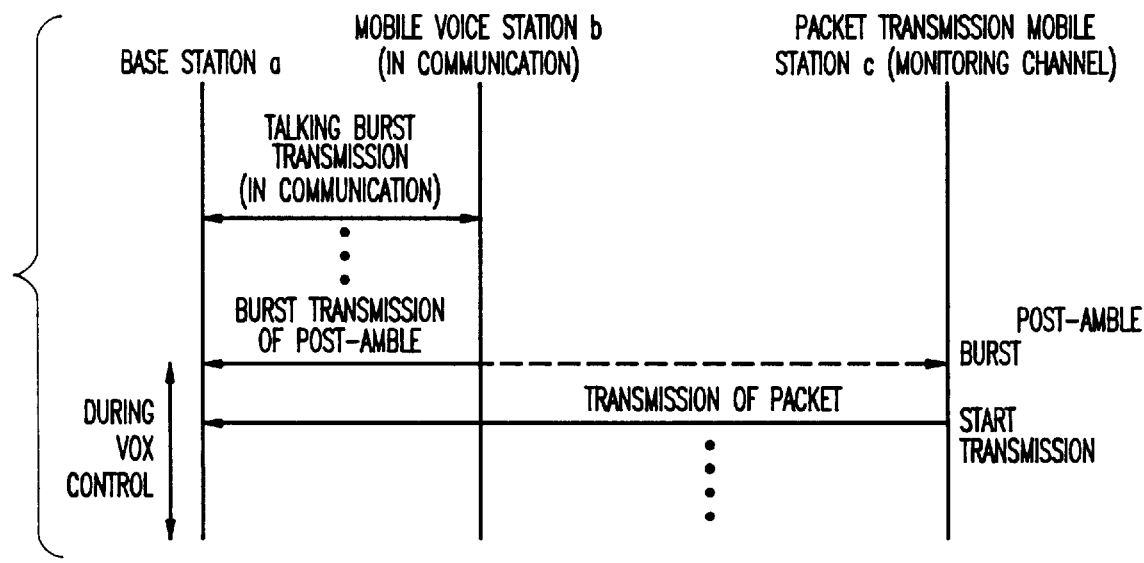
FIG. 6(b) is a schematic timing diagram illustrating the operation of the present invention during an ending voice burst.
Figure 7A:
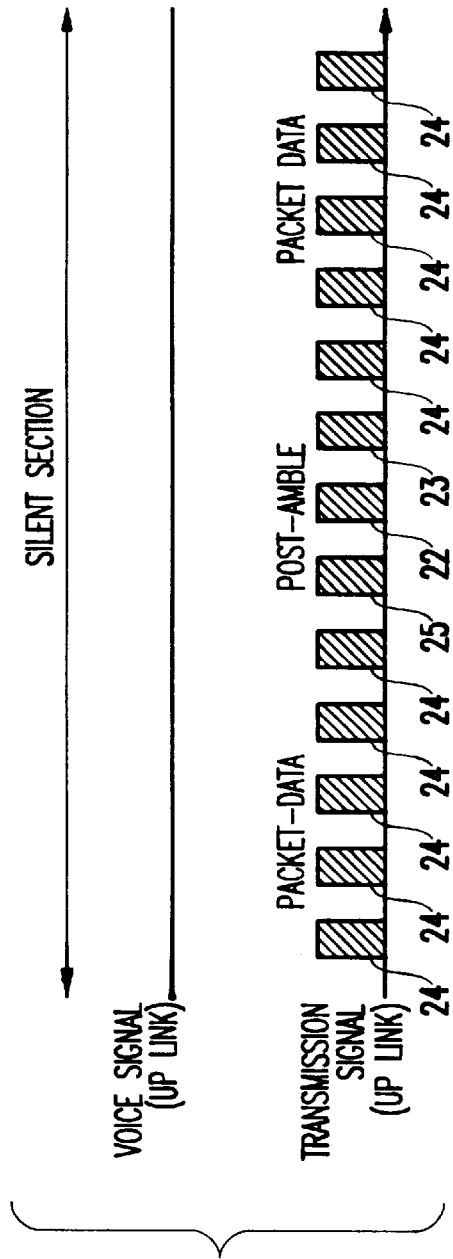
FIG. 7(a) is a schematic wave-form diagram illustrating a silent period of the present invention.
Figure 7B:
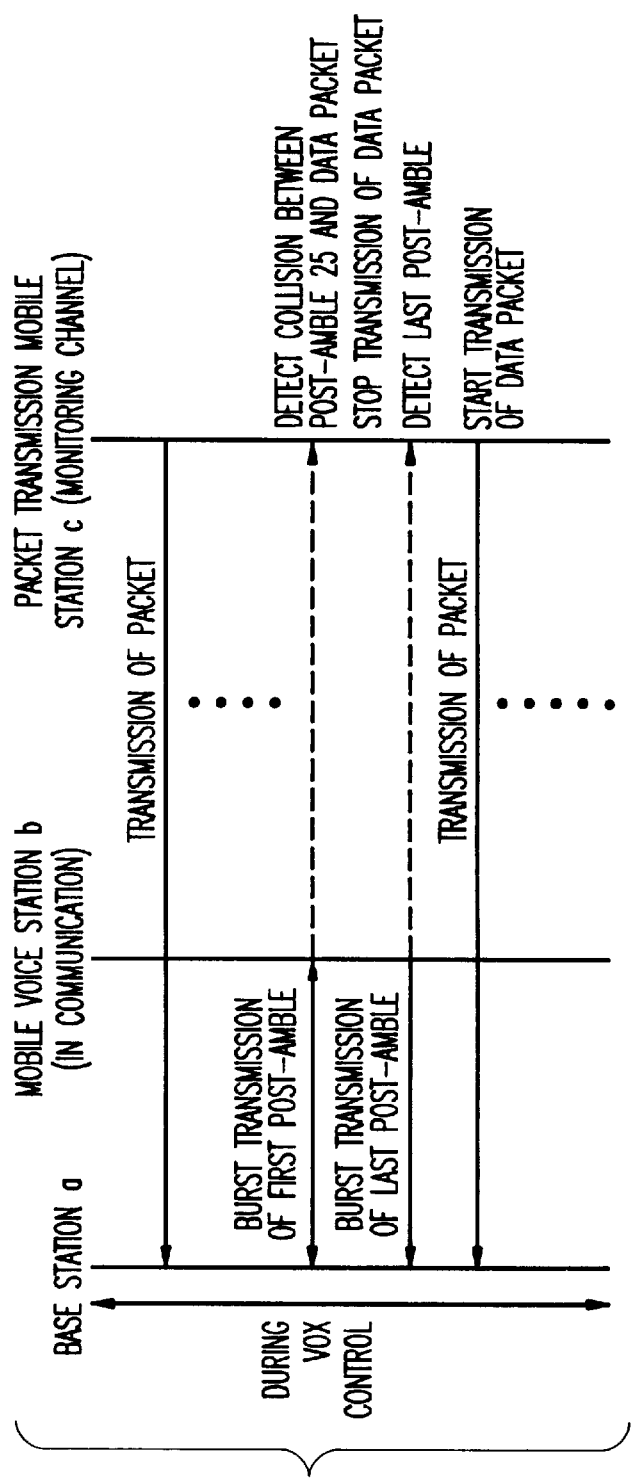
FIG. 7(b) is a schematic timing diagram illustrating the operation of the present invention during a silent period.
Figure 9A:
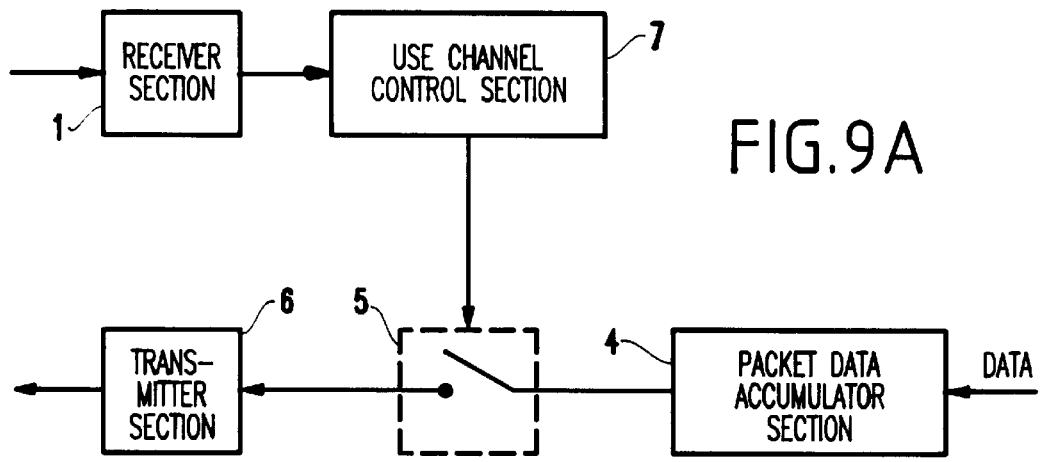
FIG. 9(a) is a schematic block diagram of a conventional packet-type transmitter.
Figure 9B:
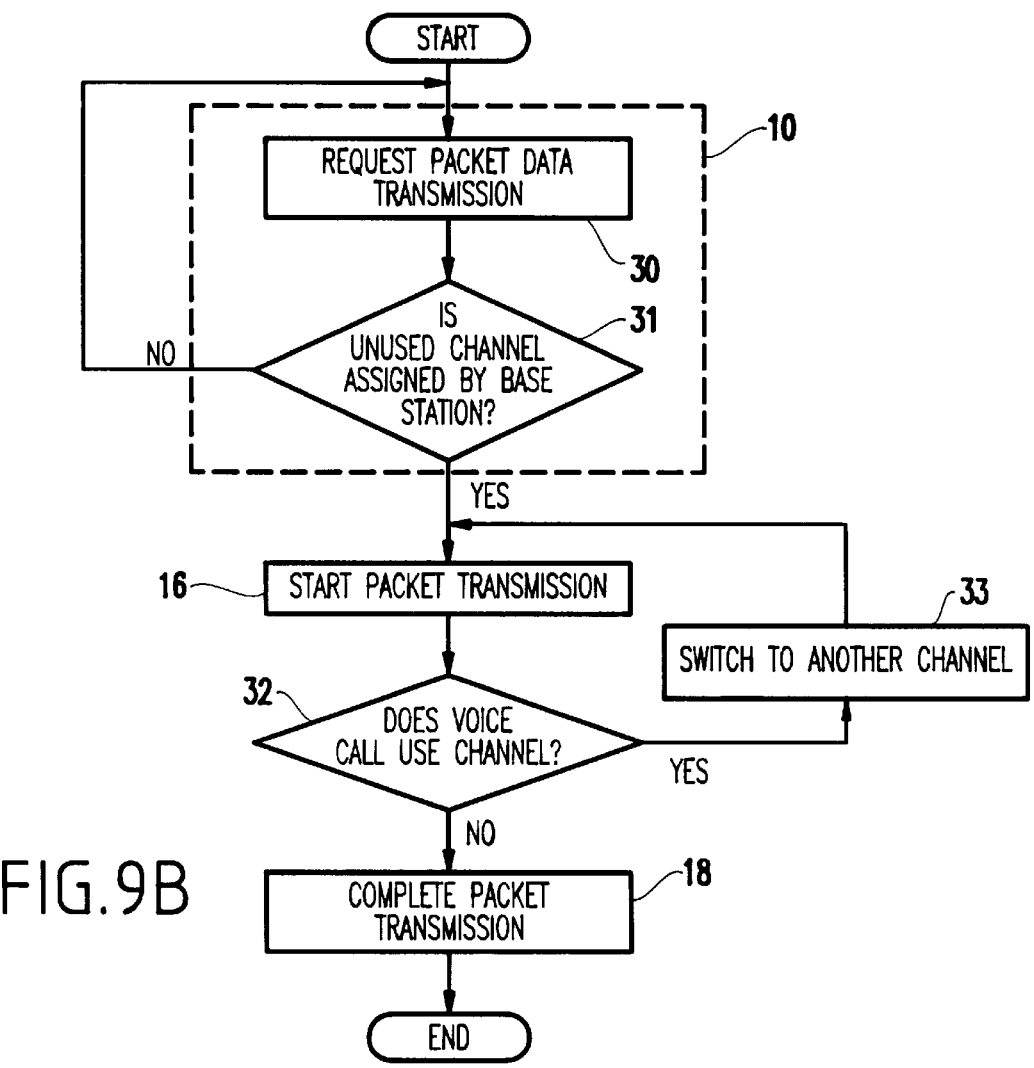
FIG. 9(b) is a flowchart illustrating the operation of the conventional packet-type transmission system of FIG. 9(a).

FIGS. 6(a)–8(b) illustrate a VOX operation, in which FIGS. 6(a) and 6(b) illustrate the operation of the invention during an ending voice burst, FIGS. 7(a) and 7(b) illustrate the operation of the invention during a silent period, and FIGS. 8(a) and 8(b) illustrate the operation of the invention during a beginning voice burst. FIG. 6(a) illustrates an ending voice burst, and FIG. 6(b) illustrates the packet transmission procedure during the ending voice burst. The mobile voice station b transmits a talking voice burst 20 when transmitting sound (e.g., a talking state) and an ending voice burst (e.g., post-amble) to indicate that a silent period will follow. The post-amble typically includes 448 bits (224 bits of unique word (PST0), and 224 bits of background noise generating information (PST1). However, since audio coding is interleaved for two slots, the post-amble is a signal across three bursts (e.g., these are not considered "voice bursts", but are standard for cellular systems such as a personal digital cellular system). The three bursts are (voice+PST0), (PST0+PST1), and (PST1+dummy), which correspond to reference numbers 21, 22 and 23 in FIG. 6(a).

As explained above, since the ending voice burst will be followed by silence, the mobile data station c transmits packets of data 24 during the silent portion (as illustrated in FIG. 6(a)). VOX control is performed during the silent section of the voice signal (the uplink) and the sending of the transmission signal (including the transmission of the post-amble and the packet data).

FIGS. 7(a) and 7(b) illustrate a second example. FIG. 7(a) is a wave-form pattern of the transmission signal under VOX control which indicates a silent voice burst (e.g., "no-voice" bursts). FIG. 7(b) illustrates the packet transmission procedure during the silent state. The mobile voice station b periodically transmits post-ambles (e.g., no more than one per second), even if the silent state continues. Post-ambles are transmitted to let the base station know that the mobile voice station is still in a communication state.

An ending voice burst (e.g., the current beginning/first post-amble) is shown as burst 25 in FIG. 7(a), which includes a dummy+PST0, instead of the ending voice burst 21 (voice+PST0) discussed with reference to FIG. 6(a).

Then, such a silent post-amble collides with packets of data being transmitted by mobile data station c. Therefore, the mobile data station c stops the transmission of data packets, again enters into the channel monitoring state (e.g., monitoring for collisions of data packets), and resumes the transmission of data packet bursts when it finds a post-amble (22, 23) from the channel of the communicating mobile voice station b. The last data packet is retransmitted once post-amble 23 is received.

The mobile data station c stops transmitting data packets when they collide with burst 25, and starts retransmitting after receiving bursts 22 and 23.

FIG. 8(a) illustrates a beginning voice burst in which the voice signal of the communicating mobile station b changes from the silent state to the talking state, and the VOX control is terminated. FIG. 8(b) illustrates a packet transmission procedure during the beginning voice burst.

When the communicating mobile voice station b changes from the silent state to the talking state, the mobile station b first transmits a preamble (PRE). Since audio coding is interleaved for two slots, the preamble becomes a signal across two bursts (e.g., these are not voice bursts). The two bursts are (dummy+PRE) and (PRE+voice), which correspond to reference numerals 26 and 27 of FIG. 8(a).

When the top preamble burst 26 collides with a packet data burst 24 (e.g., is received by) the mobile data station c, the mobile data station c stops the transmission of the data packet burst, and again enters into the channel monitoring state to wait for the next ending voice burst (e.g., a post-amble).

With the unique and unobvious structure and method of the present invention, periods when channels, which are occupied by voice transmission, are silent, can be used advantageously. During the silent periods, the invention transmits data packets. Thus, the present invention can transmit data packets even when all available channels are engaged in voice communication. As a result, the present invention reduces congestion in radio communication channels and allows more data packets to be transferred than in the conventional systems.

Moreover, according to the present invention, since a channel is not occupied in transmitting data by performing VOX control, which stops the transmission when the silent state is attained during audio communication by another mobile station, and transmitting packet data over a channel on which a burst under the VOX control is not transmitted, if there is no empty channel when the packet data transmission is requested, the packet data communication can be performed by utilizing a gap in the voice communication under the VOX control, so that a channel is not occupied and can be efficiently utilized.

Additionally, according to the present invention, even if all channels are used, the packet data communication can be continued by transmitting packet data over a channel of another mobile station on which no burst under the VOX control is transmitted. Thus, unlike the conventional systems and methods described above, congestion or interruption of packet data communication, which may be caused if voice communication uses all channels since it is given preference, may be reduced.

While the invention has been described with reference to the specific embodiments described above, it is not limited thereto and includes all variations which would be known to those ordinarily skilled in the art.

Having thus described my invention, what I claim as new and desire to secure by Letters Patent is as follows:

1. A system for acquiring a channel in radio packet data communication for use with a base station and a mobile station, in communication with said base station, for transmitting a voice burst, comprising:

a receiver for receiving said voice burst and measuring a receiving level thereof;

a ranking section for ranking a receiving state of said receiver based on receiving levels of radio waves transmitted from said mobile station; and a channel monitoring and control section for selecting a channel with a predetermined receiving state based on an output from said ranking section, and for monitoring the receiving state of the channel, wherein, for packet data communication, said mobile station selectively uses an idle channel and other channels engaged for voice communication by other mobile stations such that when said mobile station is determined not to be transmitting a voice burst on the channel, said channel is interrupted and packet data is transmitted thereover, and wherein, when a voice burst is transmitted on said channel during transmission of said packet data, the transmission of packet data is suspended, and a second mobile station not transmitting a voice burst is identified, thereby to obtain said idle channel for said radio packet data communication.

2. The system according to claim 1, wherein, when said idle channel selected for the packet data transmission by the channel monitoring and control section is used for voice communication before termination of packet data transmission, said channel monitoring and controlling section suspends the transmission of packet data, monitors for a burst which indicates termination of the voice burst, and interrupts a channel not transmitting a voice burst.

3. The system according to claim 1, further comprising a switching circuit coupled to said channel monitoring and control section.

4. The system according to claim 3, wherein, when said channel monitoring and control section receives from said ranking section information indicating termination of the voice burst as a silent state, the channel monitoring and control section determines that the channel is usable, and activates said switching circuit to transmit packet data.

5. The system according to claim 4, wherein, when said channel monitoring and control section receives from said ranking section information indicating starting of the voice burst as a taking state, said channel monitoring and control section confirms, based on said information, a state where no burst is transmitted on the channel, determines that said channel cannot be used, and controls the packet data transmission to de-activate said switching circuit.

6. The system according to claim 2, further comprising a switching circuit coupled to said channel monitoring and control section.

7. The system according to claim 6, wherein, when said channel monitoring and control section receives from said ranking section information indicating termination of the voice burst as a silent state, the channel monitoring and control section determines that the channel is usable, and activates said switching circuit to transmit packet data.

8. The system according to claim 7, wherein, when said channel monitoring and control section receives from said ranking section information indicating starting of the voice burst as a talking state, said channel monitoring and control section confirms, based on said information, a state where no burst is transmitted on the channel, determines that said channel cannot be used, and controls the packet data transmission to de-activate said switching circuit.

9. The system according to claim 1, wherein said mobile station monitors channels used by said other mobile stations and selects one of a predetermined good quality channel for said packet data communication, and wherein said channel monitoring and control section utilizes a VOX control to detect a silent period in an engaged channel for one of transmitting packet data and inserting packet data into said silent period.

10. The system according to claim 1, wherein said system is selectively employed in any one of said base station and said mobile station.

11. A system for acquiring a channel in radio packet data communication for use with a base station and a mobile station, in communication with said base station, for transmitting a voice burst, comprising:

a receiver for receiving said voice burst and measuring a receiving level thereof;

a ranking section for ranking a receiving state of said receiver based on receiving levels of radio waves transmitted from said mobile station; and a channel monitoring and control section for selecting a channel with a predetermined receiving state based on an output from said ranking section, and for monitoring the receiving state of the channel, wherein, when said mobile station is determined not to be transmitting a voice burst on the channel, said channel is interrupted and packet data is transmitted thereover, and wherein, when a voice burst is transmitted on said channel during transmission of said packet data, the transmission of packet data is suspended, and a second mobile station not transmitting a voice burst is identified, thereby to obtain an idle channel for radio packet data communication, wherein said ranking section comprises:

a power level measuring section for measuring a power level of said receiving levels of radio waves transmitted from said mobile station;

a power level comparing section for comparing said power level with a predetermined level;

a memory for storing levels of channels determined to have a level above said predetermined level and a respective channel number; and a level selection section for selecting a channel having a highest level of said channels determined to have a level above said predetermined level, said level selection section providing an output to said channel monitoring and control section.

12. The system according to claim 11, wherein said channel monitoring and control section comprises:

a postamble monitoring/supervising section for receiving an output from said level selection section and for monitoring postambles of a selected channel, such that packet data is transmitted when a postamble has been received by said channel monitoring and control section; and a collision monitoring section for determining whether a collision has occurred between said voice burst and said packet data, wherein, when said collision monitoring section detects a collision, said collision monitoring section provides an output to terminate said radio packet data communication, and when no collision is detected by said collision monitoring section, said radio data packet communication continues to completion.

13. A system for acquiring a channel in radio packet data communication for use with a base station and a mobile station, in communication with said base station, for transmitting a voice burst, comprising:

a receiver for receiving said voice burst and measuring a receiving level thereof;

a ranking section for ranking a receiving state of said receiver based on receiving levels of radio waves transmitted from said mobile station; and a channel monitoring and control section for selecting a channel with a predetermined receiving state based on an output from said ranking section, and for monitoring the receiving state of the channel, wherein, when said mobile station is determined not to be transmitting a voice burst on the channel, said channel is interrupted and packet data is transmitted thereover, and wherein, when a voice burst is transmitted on said channel during transmission of said packet data, the transmission of packet data is suspended, and a second mobile station not transmitting a voice burst is identified, thereby to obtain an idle channel for radio packet data communication, wherein said channel monitoring and control section comprises:

a postamble monitoring/supervising section for receiving an output from said ranking section and for monitoring postambles of a selected channel, such that packet data is transmitted when a postamble is received by said channel monitoring and control section; and a collision monitoring section for determining whether a collision has occurred between said voice burst and said packet data, wherein, when said collision monitoring section detects a collision, said collision monitoring section provides an output to terminate said radio packet data communication, and when no collision is detected by said collision monitoring section, said radio data packet communication continues to completion.

14. A communication system comprising:

a base station;

a first station in voice communication with said base station; and a second station in data communication with said base station, wherein said second station monitors said voice communication and identifies a predetermined period of said voice communication, said second station transmitting data packets during said predetermined period, wherein, for packet data communication, said second station selectively uses an idle channel and other channels engaged, for voice communication, by mobile stations.

15. The system according to claim 14, wherein said first station comprises a first mobile station and said second station comprises a second mobile station, and wherein said predetermined period comprises a silent period between audible sounds.

16. The system according to claim 15, wherein said silent period comprises a period between an ending voice burst and a beginning voice burst.

17. The system according to claim 14, wherein said voice communication and said data communication are made on a same channel.

18. The system according to claim 15, further comprising a plurality of first mobile stations, and said base station communicates with said first mobile stations on separate channels, wherein said second mobile station includes means for monitoring said channels and for transmitting said data packets on selected ones of said separate channels which include said predetermined period.

19. The system according to claim 14, wherein said first station comprises a first mobile station and said second station comprises a second mobile station, wherein said second mobile station monitors channels used by said first mobile station and selects one of a predetermined good quality channel for transmitting data packets in said packet data communication, and wherein said second mobile station utilizes VOX control to detect a silent period in an engaged channel of said first mobile station for one of said transmitting of said data packets and inserting said data packets into said silent period.

20. A communication system comprising:

a base station:

a first station in voice communication with said base station:

a second station in data communication with said base station, wherein said second station monitors said voice communication and identifies a predetermined period of said voice communication, said second station transmitting data packets during said predetermined period, and wherein said first station comprises a first mobile station and said second station comprises a second mobile station, said predetermined period comprising a silent period between audible sounds; and a plurality of first mobile stations, and said base station communicates with said first mobile stations on separate channels, wherein said second mobile station includes means for monitoring said channels and for transmitting said data packets on selected ones of said separate channels which include said predetermined period, and means for ranking a receiving level of each of said channels.

21. The system according to claim 20, wherein said means for ranking comprises:

a power level measuring section for measuring a power level of said receiving levels of radio waves transmitted from said mobile station;

a power level comparing section for comparing said power level with a predetermined level;

a memory for storing levels of channels determined to have a level above said predetermined level and a respective channel number; and a level selection section for selecting a channel having a highest level of said channels determined to have a level above said predetermined level, said level selection section providing an output to said means for monitoring.

22. The system according to claim 20, wherein said means for monitoring comprises:

a postamble monitoring/supervising section for receiving an output from said means for ranking and for monitoring postambles of a selected channel, such that a data packet is transmitted when a postamble is received by said means for monitoring; and a collision monitoring section for determining whether a collision has occurred between said voice communication and said transmitting of data packets, wherein, when said collision monitoring section detects a collision, said collision monitoring section provides an output to terminate said transmitting of data packets, and when no collision is detected by said collision monitoring section, said transmitting of said data packets continues to completion.

23. The system according to claim 21, wherein said means for monitoring comprises:

a postamble monitoring/supervising section for receiving an output from said means for ranking and for monitoring postambles of a selected channel, such that a data packet is transmitted when a postamble has been received by said means for monitoring; and a collision monitoring section for determining whether a collision has occurred between said voice communication and said transmitting of data packets, wherein, when said collision monitoring section detects a collision, said collision monitoring section provides an output to terminate said transmitting of data packets, and when no collision is detected by said collision monitoring section, said transmitting of said data packets continues to completion.

24. A method for acquiring a channel in radio packet data communication system including a base station and a mobile station, in communication with said base station, for transmitting a voice burst, comprising:

receiving said voice burst and measuring a receiving level thereof;

ranking a receiving state based on receiving levels of radio waves transmitted from said mobile station;

selecting a channel with a predetermined receiving state based on said ranking, and monitoring the receiving state of the channel;

determining whether said mobile station is not transmitting a voice burst on the channel;

based on said determining, interrupting said channel and transmitting packet data thereover; and when said determining determines a voice burst is transmitted on said channel during transmission of said packet data, suspending the transmission of said packet data, and identifying a second mobile station not transmitting a voice burst, thereby to obtain an idle channel for radio packet data communication.

25. The method according to claim 24, further comprising:

when said idle channel obtained for the packet data transmission is used for voice communication before termination of packet data transmission, suspending the transmission of packet data;

monitoring for a burst which indicates termination of the voice burst; and interrupting a channel not transmitting a voice burst.

26. The method according to claim 24, further comprising:

when the voice burst is terminated and a silent state is determined, determining that the channel is usable, and transmitting packet data.

27. The method according to claim 26, further comprising:

when starting of the voice burst as a talking state is obtained again, confirming a state where no burst is transmitted on the channel;

determining that said channel cannot be used; and terminating the packet data transmission.

28. The method according to claim 24, wherein said ranking comprises:

measuring a power level of said receiving levels of radio waves transmitted from said mobile station;

comparing said power level with a predetermined level; and storing levels of the channels determined to have a level above said predetermined level and a respective channel number, and wherein said selecting comprises:
selecting a channel having a highest level of said channels determined to have a level above said predetermined level.

29. The method according to claim 24, wherein said determining comprises:

monitoring postambles of a selected channel to control transmission of packet data; and determining whether a collision has occurred between said voice burst and said packet data, wherein, when a collision is detected, said radio packet data transmission is terminated, and when no collision is detected, said radio packet data transmission continues to completion.

* * * * *